United States Patent
Erickson et al.

(10) Patent No.: US 9,929,915 B2
(45) Date of Patent: Mar. 27, 2018

(54) SYSTEMS AND METHODS FOR NETWORK MANAGEMENT

(71) Applicant: Forward Networks, Inc., Los Altos, CA (US)

(72) Inventors: David Erickson, Sunnyvale, CA (US); Brandon Heller, Menlo Park, CA (US); Nikhil Handigol, Sunnyvale, CA (US); Peyman Kazemian, Redwood City, CA (US); Sivasankar Radhakrishnan, Sunnyvale, CA (US)

(73) Assignee: FORWARD NETWORKS, INC., Los Altos, CA (US)

( * ) Notice: Subject to any disclaimer, the term of this patent is extended or adjusted under 35 U.S.C. 154(b) by 161 days.

(21) Appl. No.: 14/813,841

(22) Filed: Jul. 30, 2015

(65) Prior Publication Data

US 2016/0036636 A1 Feb. 4, 2016

Related U.S. Application Data (60) Provisional application No. 62/031,009, filed on Jul. 30, 2014.

(51) Int. Cl.
*H04L 12/24* (2006.01)

(52) U.S. Cl.
CPC ........ *H04L 41/145* (2013.01); *H04L 41/0853* (2013.01); *H04L 41/0631* (2013.01); *H04L 41/0893* (2013.01); *H04L 41/12* (2013.01)

(58) Field of Classification Search
None
See application file for complete search history.

(56) References Cited

U.S. PATENT DOCUMENTS 5,754,831 A * 5/1998 Berman ................. H04L 41/145
370/230
6,512,824 B1 1/2003 Hsieh et al.
(Continued)

OTHER PUBLICATIONS

"International Search Report dated Oct. 23, 2015" received in application No. PCT/US15/42966.
(Continued)

*Primary Examiner* — Ricky Ngo
*Assistant Examiner* — Stephen Steiner
(74) *Attorney, Agent, or Firm* — Hogan Lovells US LLP (57) ABSTRACT

Embodiments relate generally to network hardware, network software and methods for network management and testing. In some embodiments, state information (e.g., configuration data, forwarding states, IP tables, rules, network topology information, etc.) can be received from devices in a network. The state information can be parsed and used to generate a network model, which describes how data is processed by the network. Using the model, possible flow paths of data through the network can be identified and used to analyze the network and identify network behavior, such as types of traffic, frequency of rule matches, what kind of transformation occurs as traffic flows through the network, and where the traffic gets dropped, etc. Policies can be verified against the network model to ensure compliance, and in the event of non-compliance, a report or interface can indicate the cause and/or allow a user to explore specific details about the cause.

20 Claims, 7 Drawing Sheets

(56) References Cited

U.S. PATENT DOCUMENTS

| | | | |
|---|---|---|---|
| 7,505,463 B2* | 3/2009 | Schuba | G06N 5/025 370/392 |
| 7,937,755 B1 | 5/2011 | Guruswamy | |
| 2004/0199808 A1 | 10/2004 | Freimuth et al. | |
| 2005/0076104 A1 | 4/2005 | Liskov et al. | |
| 2005/0204028 A1* | 9/2005 | Bahl | H04L 41/145 709/223 |
| 2007/0025355 A1* | 2/2007 | Cohen | H04L 41/145 370/392 |
| 2010/0085878 A1* | 4/2010 | McDade | H04L 41/0631 370/242 |
| 2011/0283016 A1 | 11/2011 | Uchida | |
| 2014/0165207 A1 | 6/2014 | Engel et al. | |

OTHER PUBLICATIONS

International Preliminary Report on Patentability issued in Application No. PCT/US2015/42966 dated Jan. 31, 2017.

\* cited by examiner

SYSTEMS AND METHODS FOR NETWORK MANAGEMENT

CROSS-REFERENCES TO RELATED APPLICATIONS

This application claims priority to U.S. Provisional Patent Application No. 62/031,009, filed Jul. 30, 2014, titled "SYSTEM AND METHOD FOR NETWORK MANAGEMENT," by David Erickson, et al., which is incorporated herein by reference in its entirety for all purposes.

BACKGROUND

Networks are growing more and more complex as the backbones of modern information technology systems. A typical large company may employ hundreds or thousands of devices and software components from different vendors to form its network infrastructure. Growth in complexity and size also brings more points of failure, such as forwarding loops, configuration mistakes, reachability issues, or hardware failures.

Diagnosing network failures is difficult for several reasons. First, the forwarding states associated with each network device are distributed throughout the network and defined by their corresponding forwarding tables and other configuration parameters. Second, the distributed forwarding states are difficult to monitor—often requiring the network administrator to manually login to the device and conduct a low-level test. Third, multiple administrators or users can edit the forwarding states at the same time, resulting in inconsistent forwarding states.

Conventional network diagnosis methods and tools are labor intensive, time consuming and often protocol dependent. For example, network administrators may use rudimentary tools (e.g., ping, traceroute, and Simple Network Management Protocol) to track down network failures. Such methods only cover a tiny fraction of the network state space. The diagnosis process becomes even more difficult with the current trend of increasing network size and complexity.

Additionally, conventional network diagnosis methods and tools are ad hoc in nature as they only solve the manifested issues in the network. For example, simple questions such as "Can host A talk to host B?" or "Can customer X listen to the communication?" are difficult to answer. Thus, conventional tools cannot foresee or prevent problems before they arise.

On the other hand, large software companies can push out new software products quickly because they have a huge quantity of tests that comprehensively test the behavior of their software products prior to deployment. However, current network management and testing lacks sufficient testing capability to provide confidence that the network will work when deployed, especially when there are changes to the network several times a day.

Thus, there is a need to develop methods and tools to manage and verify networks in a fast, large-scale, automated, and systematic way.

BRIEF DESCRIPTION OF THE DRAWINGS

Various embodiments or examples of the invention are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

In some embodiments, state information (e.g., configuration data, forwarding states, IP tables, rules, network topology information, etc.) can be received from devices in a network. The state information can be parsed and used to generate a network model, which describes how data is processed by the network. Using the model, possible flow paths of data through the network can be identified and used to analyze the network and identify network behavior, such as types of traffic, frequency of rule matches, what kind of transformation occurs as traffic flows through the network, where the traffic gets dropped, etc.

Using the network model, a network manager or other such entity can create various kinds of tests for the network. For example, a network manager can create tests to verify that "users X, Y, and Z can send information to each other", "users can send information only across a certain range of IP addresses or transport ports", or "user A should never be able to talk with user B", or a wide range of areas.

There can be various applications that can take advantage of various aspects of the present invention. For example, for a service builder during development, the present invention can be used to make sure the written code enables the network to function properly. Alternatively, in a production environment, the present invention can be used to validate the current behavior of the network or test the effect of proposed changes.

Furthermore, according to some embodiments, once the network behavior is understood by a network manager, crafted physical packet(s) to match output from the model can be generated and sent into the physical network to make sure that the hardware behaves the way that the model predicts, to detect hardware malfunctions.

Figure 1:
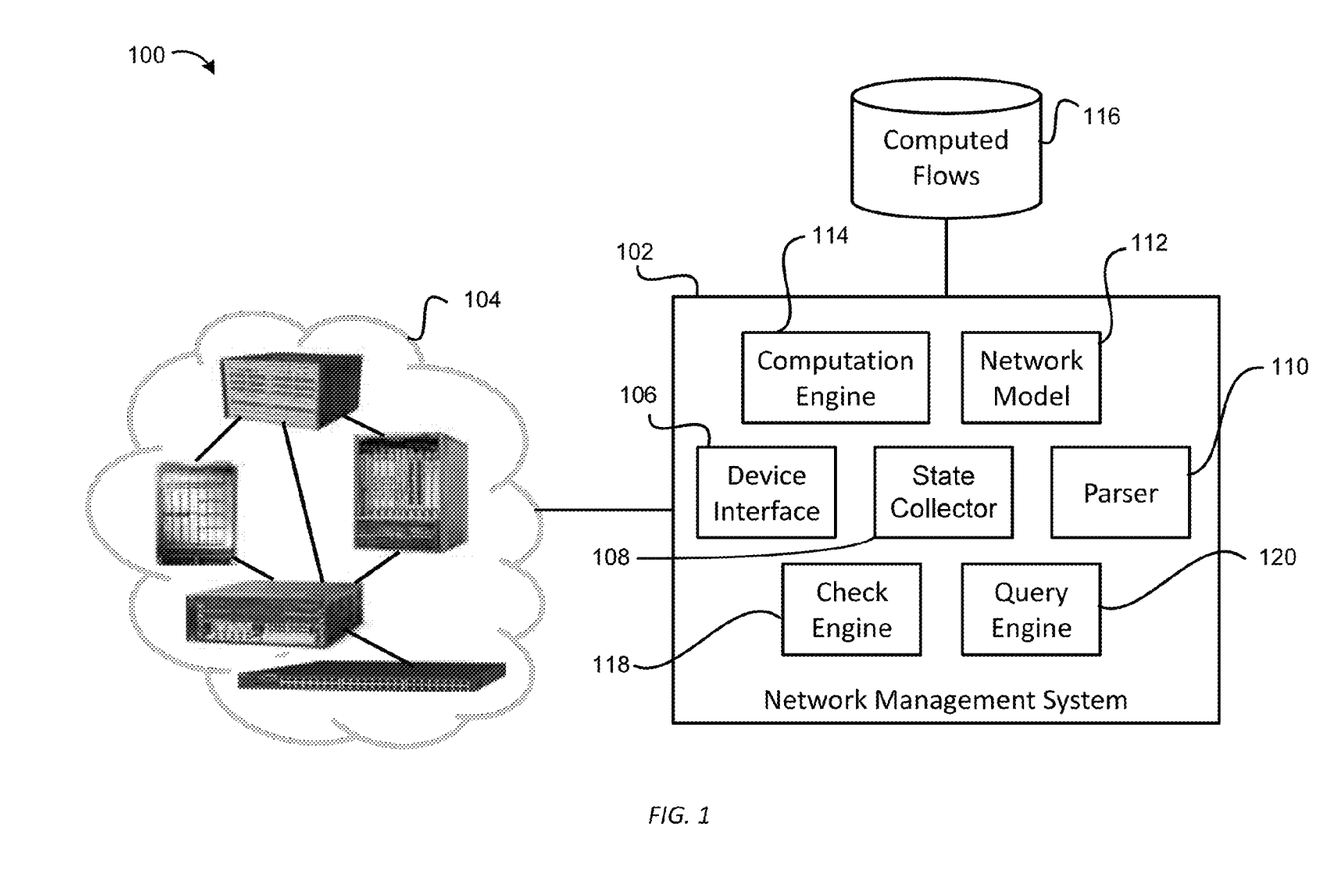
FIG. 1 illustrates a high level diagram of a network management system, in accordance with an embodiment of the present invention.

FIG. 1 illustrates a high level diagram 100 of a network management system, in accordance with an embodiment of the present invention. As shown in FIG. 1, network management system 102 can connect to a network 104 that includes a plurality of network devices (e.g., switches, routers, firewalls, load balancers, gateways, bridges, and other network devices). Each network device may be produced by a different vendor and may implement different operating systems, control interfaces, protocols, etc. Accordingly, network management system 102 can include a plurality of device interfaces 106, which may include vendor-specific, device-specific, and/or protocol-specific interfaces, through which network management system 102 can communicate with each network device.

In some embodiments, and as described further below with respect to FIG. 2, network management system 102 can include one or more state collectors 108 and one or more parsers 110. The state collectors 108 and parsers 110 can communicate with the network devices using device interfaces 106 to obtain state information for each network device. State information may vary from network device to network device and can include one or more of forwarding states, configuration files, internet protocol (IP) tables, topology information, and rules. State information can be parsed by the parsers to generate a network model 112, which describes how data is processed in the modeled network. A computation engine 114 can use the network model 112 to identify possible path flows that data may travel over in the network model 112. In some embodiments, the path flows may be stored in a data store, such as computed flows data store 116, which may be stored locally with network management system 102 or remotely.

In some embodiments, network management system 102 can further include a check engine 118 and a query engine 120. As described further below, check engine 118 can analyze flow paths stored in data store 116 to identify various properties, such as path, header, hop counts, quality of service (QoS), queues, ports, physical devices the flow traverses, tables within the device, forwarding type of the packet, packet header modifications, encapsulated packet header properties, or allocated bandwidth, or other properties. This enables the modeled network to be analyzed to verify that the network is functioning according to prescribed standards (e.g., set by a network administrator, developer, or other entity). Query engine 120 can be used to identify particular flow paths that meet queried criteria (e.g., failover flow paths between specified points, flow paths that traverse particular network devices in a particular order, etc.).

Figure 2:
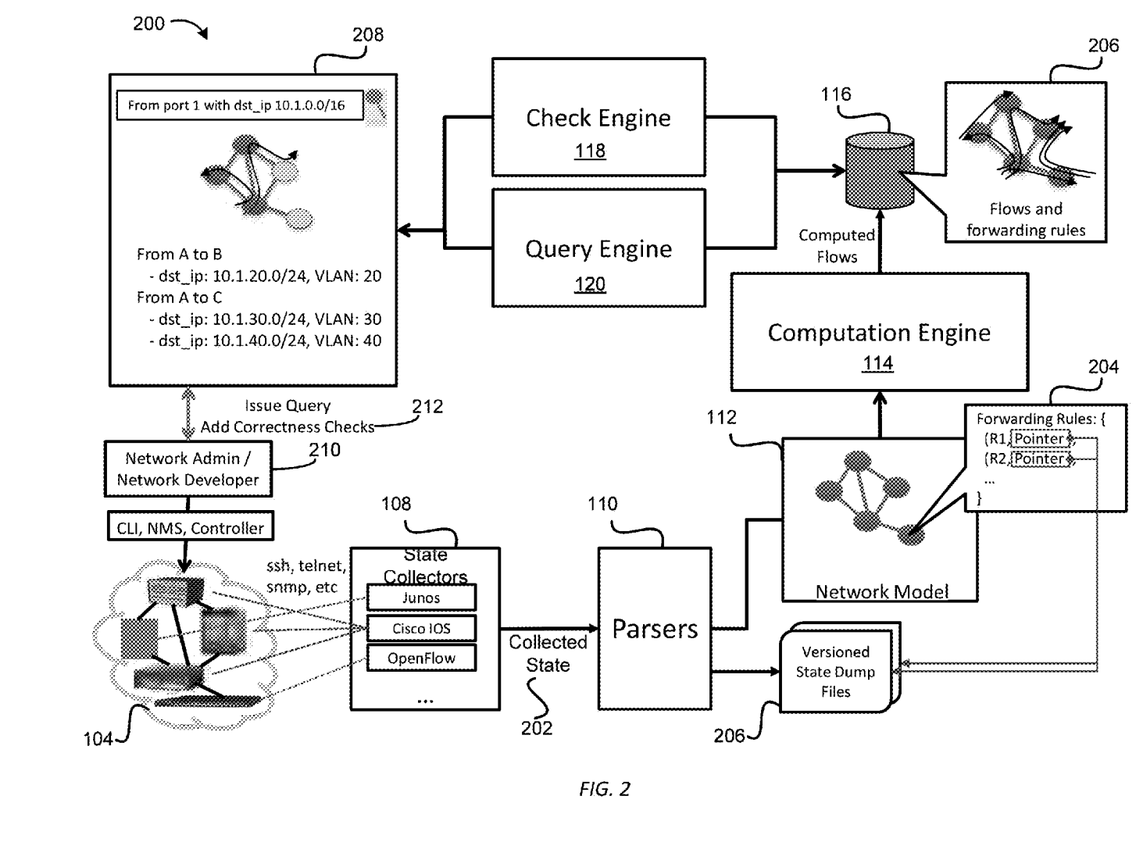
FIG. 2 illustrates a diagram of the network management system, in accordance with an embodiment of the present invention.

FIG. 2 illustrates an example 200 of a network management system that can be utilized to provide for automated and systematic management of the network via generating and utilizing a virtualized network model of the physical network. According to some embodiments, the present invention includes a system that collects network state information and enables searches for different types of traffic that can exist in the network. As seen in FIG. 2, in some embodiments, a network 104 can comprise numerous network devices including switches and routers from different vendors, such as Cisco and Juniper. Any or all of these network devices can have associated state information, including configuration data and/or forwarding states which may be written by a control plane, and which may be defined by one or more IP tables and other forwarding rules. The forwarding states can be used to implement the network's forwarding policy, which specifies how different classes of traffic are routed in the network as well as how much bandwidth is allocated to those classes of traffic.

Still referring to FIG. 2, the network management system can use one or more state collectors 108 to collect the state information, such as "snapshots" of the forwarding states, via connecting to the devices through SSH, telnet, SNMP, NETCONF, OpenFlow, or via any other device interface that enables the collectors to collect information from the device. The collected state information can include forwarding states, configuration files, IP tables, OpenFlow rules, topology information, and any other configuration or state made available by the device. Each snapshot may be augmented with information provided by a user, such as topology data. In addition, state collectors can periodically generate the collected state information. In some embodiments, the state collectors 108 can collect the state information only when a change in at least one forwarding state is detected.

In some embodiments, the network management system can use one or more parsers 110 to translate the collected state information 202 to construct a network model 112. In some embodiments, parsers 110 can be vendor-specific or protocol-specific. For example, the system can use a Cisco parser for parsing Cisco IOS, including reading IOS command output, compressing IP forwarding tables, and generating vendor-independent forwarding descriptions that model the function of the device. In another example, the system can use a Juniper Junos parser for forwarding states associated with Juniper devices, or an OpenFlow parser for forwarding states associated with OpenFlow devices. In some embodiments, an incremental parser can be used to track the changes in the collected forwarding state and quickly update the network model 112.

The network model 112 can be a vendor/protocol independent model for data processing (e.g., packet processing) in the network 104. The network model can include forwarding rules 204 that are used to determine how packets are processed by devices in the network. In some embodiments, the network model 112 can be periodically updated. In some embodiments, instead of recomputing the entire network model each time the actual network's state changes, the network model 112 can be incrementally updated by only updating the associated changed forwarding states, which can be realized through rule dependency tracking. In rule dependency tracking, an individual update to a state table, such as a VLAN change at an input port, automatically causes rules that match that input port to update, without requiring the re-generation of other unrelated rules. The list of updated rules may then be used to update the modeling of affected traffic classes and paths in the network, leaving the rest of the model unaffected.

In some embodiments, the network management system can include Versioned State Dump Files 206 that are associated with the network model 112. The Versioned State Dump Files 206 can support back-tracking to connect specific traffic flows to the configuration and state files and lines of configuration and state files that caused them. In this way, observed connectivity and policy errors can be automatically linked to their root causes.

As shown in FIG. 2, a computation engine 114 can identify possible flow paths in the network in a port-to-port manner through generating symbolic packets and pushing the symbolic packets through the network model. In addition to the traditional bits (0 or 1), a symbolic packet may have one or more wild cards (*) present. The symbolic packet can replace wild cards with 0 or 1 upon encountering a forwarding rule. Thus, the symbolic packet can demonstrate how a packet or a class of packets is modified as it travels by composing the transfer functions along the path.

In some embodiments, the computation engine can generate a minimal set of physical packets so that every forwarding rule is exercised and covered by at least one physical packet. In another embodiment, the physical packets can be created for every possible external outlet, so that the "crawling" of the network is systematic, instead of fractional.

In some embodiments, the computation engine can save the identified possible flow paths and forwarding rules 206 in a flow path database 116, including the possible flow paths and hops, along with flow path information associated with a given packet traveling on the flow path, such as header value changes, rules that the packet matches, the transformations at each hop, etc.

In some embodiments, the computation engine 114 can periodically update the flow path database. In another embodiment, the computation engine can incrementally update the flow path database only to reflect the changed forwarding rules and the updated flows.

A check engine 118 can use the flow path database 116 to check properties of possible flows in the network such as path, header, hop counts (the number of physical or virtual network elements a flow traverses, or the number of tables within those devices it traverses), quality of service properties such as priority, queues, ports, physical devices the flow traverses, tables within the device, physical characteristics such as location(s) or distance, forwarding type of the packet (L2, L3, MPLS, etc.), packet header modifications, encapsulated packet header properties, or allocated bandwidth. In one example, a check can be issued to determine whether a certain flow exists. In another example, a check can be issued to verify that "from Port 1, all the traffic that has IP address IP1 should reach Port 2". In another example a check could be issued to validate that sufficient failover paths exist between specified locations to ensure traffic and flows will still be able to pass between the locations in the event of a failure on a path. Check engine 118 can also check for the absence of flows matching specified properties. Meta-checks can also be created that check for higher-level policy such as "user1 endpoints are fully reachable", or "user1 endpoints are fully isolated", or "user1 is PCI compliant", which within the system would be decomposed to one or more basic checks based on properties specified previously. In some embodiments, the system can issue a "can-reach-all" check or a "cannot-reach-any" check. For example, given two subnets, can each IP in the source subnet reach every IP in the destination subnet? This example can be generalized to "header objects", which are descriptions of packet header values that may contain one or more wildcard values. The corresponding question would be, "can every potential packet value in the source header object reach every potential packet value in the destination header object?".

According to some embodiments, certain checks can be defined to run through the network regularly. In some embodiments, the checks can be defined to execute at particular times or particular time intervals. In some embodiments, the checks can be defined to execute upon the detection of particular network events. For example, given it is expected that there is connectivity between two ports using a specific packet, this specific packet can be used to check the connectivity between the two ports whenever there is a change in the network.

In some embodiments, a query engine 120 can use the flow path database 116 to find flows with a certain path, header value, or allocated bandwidth. In some embodiments, a query language can be used to query the flow path database. For example, a query 208 can search for possible flow paths from Port 1 with destination IP subnet 10.1.0.0/16. In another example, a query can search for a range of destination IP addresses that a specific packet can reach. In yet another example, a query can search for all possible flow paths that traverse routers R1, R2, and R3 in that order or go through no more than 3 hops from source to destination. In another example, a query can search for all flows that follow a certain path through the network.

The present invention can include a query interface to provide query function to the network. For example, a network manager 210 can issue a query 212 for "flows from a particular device", and the query engine can provide all possible flows from the particular device. A query can also be issued to show what happens to packets going from one device to another device. A query may also find all packets that reach its destination with a particular packet header.

In addition, embodiments of the present invention can include a check interface to verify whether certain flow(s) should be present or not. For example, the network manager 210 can issue a check for "expect flows from this device to another device". Embodiments of the present invention can further reveal information as to why a particular check fails, such as showing why no flows exist between two devices, or finding flows when there should be none. For example, when a check "expect flows from device1 to device2" fails, the invention can present the user with information about where the flows from device1 to device2 are being dropped, for instance at a misconfigured firewall device. In another example, when a check "no flows are expected from port1 to port2" fails, the invention can provide details on the one or more flows that go from port1 to port2 thereby causing the check to fail. In another example of a failed can-reach-all check from IP subnetA to IP subnetB, the invention can indicate which IP addresses in subnetA cannot reach IP addresses in subnetB and further provide details on where these respective flows get dropped in the network.

According to some embodiments, the present invention can generate an analytic report on the network. For example, the analytic report can give suggestions to the network administrators on how to improve the performance of the network, or show whether the network has some security weak points. Furthermore, the present invention can reduce the knowledge burden of the network administrator, as it does not require the administrator to log in to each device, understand device configurations, understand how to retrieve them, or reason about interactions between forwarding tables. Analytic reports may contain suggestions for cross-network decisions such as determining the optimal routing path across networks, or optimal peering or caching locations. Analytic reports could also contain cross-customer statistics such as most used device types and how the network devices are most frequently used.

In another example, the present invention can provide a differentiation chart on the behavior history of the network. For example, the network management system can keep taking "snapshots" of the network, and it can reveal why a failure occurs through comparing and differentiating between different snapshots' network data as well as their behavior.

According to some embodiments, the present invention can provide a method to compute and query for the differences between the configuration and state of the network at two different points of time or "snapshots". In some embodiments, this difference can indicate only those changes that actually affected the behavior of the network. For example, suppose there were ten different changes to the border gateway protocol (BGP) configuration on router1, eight of which did not affect the forwarding behavior of the network, whereas two changes affected forwarding behavior through the network. A network manager or user may, in some examples, use this information to determine quickly which changes to a network configuration may be associated with a network failure occurred.

In some embodiments, the system can identify the behavioral differences of two network snapshots. The behavior differences can be searched such that the returned results only show the flow paths that are added or deleted and match the characteristics specified in the search. For example, a search for flows "from port 1 destined to IP subnet 10.1.0.0/16" may show two added flow paths that can enter the network with VLAN 10 and 11 and one removed flow path which could previously enter the network with VLAN 9.

The present invention also provides a system to compute and query for any differences in topology as the network evolves. In some examples, this can include the addition or removal of network devices, addition or removal of links between the devices, etc.

In some embodiments, the present invention can provide an interface to automatically use the information about the history of changes in the network to determine the possible causes of check failures in the network and suggest possible fixes to a network manager or user. In some examples, the user may further add "tags" or notes about past network events that can indicate important events in the evolution of the network, including events that might have caused network behavior to change.

Embodiments of the present invention can identify when a set of changes to network configuration or to network devices does not cause any behavioral differences to the network. In some embodiments, network checks are created to indicate the intended network behavior or invariants. In other embodiments, the expected network behavior may be inferred automatically via a combination of paths, traffic types and their transformations through the network or the trace of symbolic packets through the network. Further, symbolic packets may also be matched across the different points of time, being compared based on different criteria to not only identify additions and removals from the set of all possible ways the network treats traffic, but also to identify those types of traffic or paths or symbolic packets whose behavior has been modified in some way. For example, traffic from IP address 10.0.0.1 to IP address 10.1.0.1 may have traversed over a path router1 to router2 to router3 in the first network "snapshot", but traverses over a path through router1 to router4 to router3 in the second network "snapshot".

In some embodiments, the system can be used to automatically extract the current forwarding policies of the network and convert them into checks. These checks can be applied to future snapshots to detect any violation of these policies. For example, the current subnet and port connectivity can be extracted and converted to a set of checks.

Figure 3:
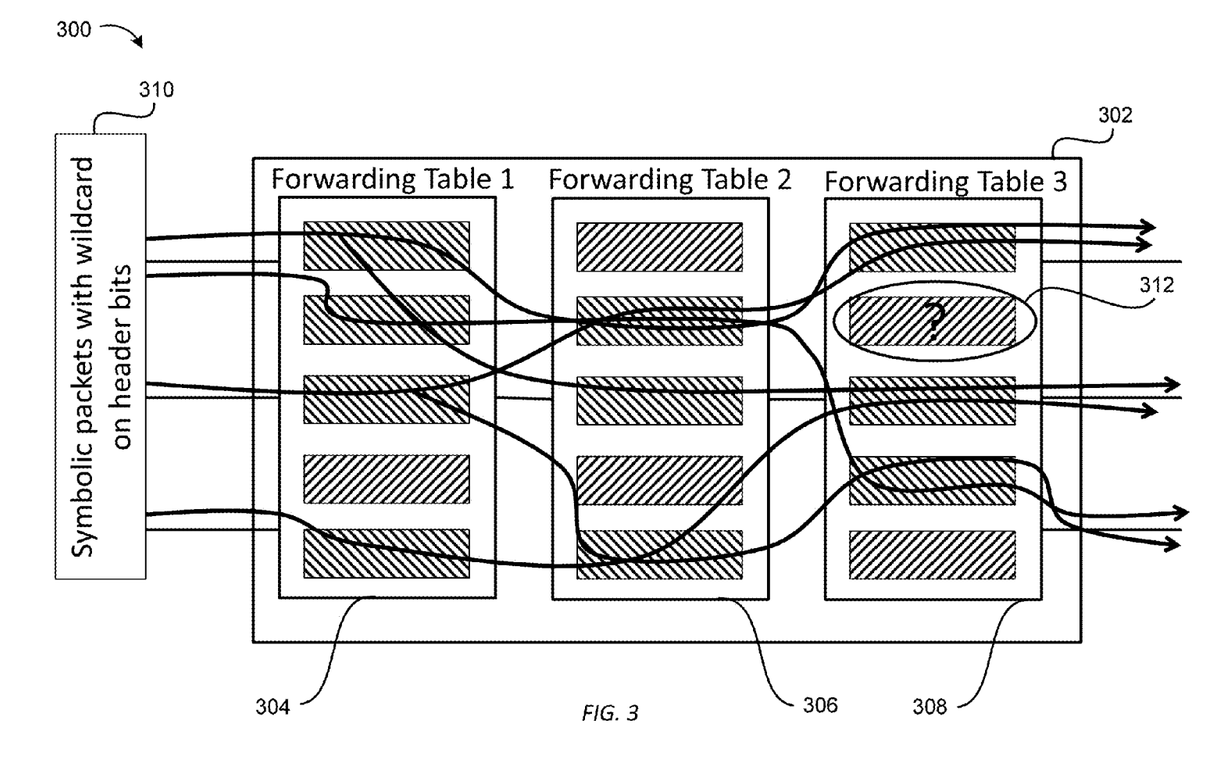
FIG. 3 is a diagram illustrating an example of identifying dead forwarding rules, in accordance with an embodiment of the present invention.

According to some embodiments, the network management system can detect and investigate dead forwarding rules. Dead rules are defined as rules that cannot be exercised and thus can be safely removed from the network. FIG. 3 is a diagram 300 illustrating an example of identifying dead forwarding rules, in accordance with an embodiment of the present invention. As shown in FIG. 3, a forwarding device 302 can include, for example, forwarding table 1 304, forwarding table 2 306, and forwarding table 3 308. Each of forwarding tables 1, 2 and 3 (304, 306, and 308) can include one or more forwarding rules (indicated as hashed boxes), among which some of the forwarding rules are dead rules 312 that cannot be exercised or hit at all. To find these dead rules, the computation engine can generate and push a set of symbolic packets 310 with a wildcard (*) on every header bit to find the dead rules that cannot match any packet. When each possible forwarding path has been identified, those rules that have not been used to forward any packet can be identified as dead rules, such as rule 312.

Embodiments of the present invention can determine network test coverage percentage. In one example, given a set of test packets, the system can compute the fraction of network ports, links, rules, queues, etc., covered. In another example, the system can compute the test packets and/or probe locations needed to achieve the desired level of network test coverage.

Figure 4:
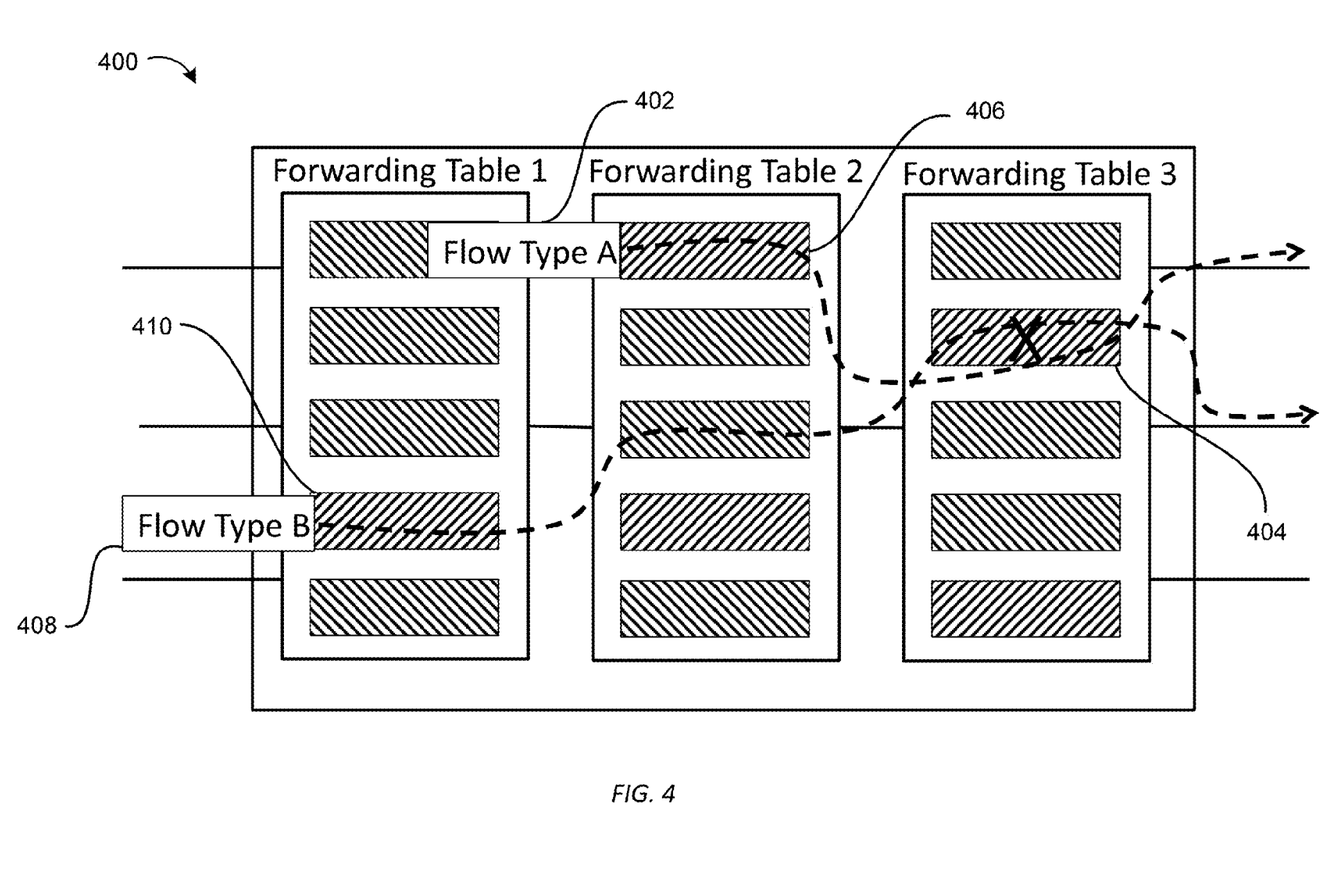
FIG. 4 is a diagram illustrating an example of investigating dead rules, in accordance with an embodiment of the present invention.

FIG. 4 is a diagram 400 illustrating an example of investigating dead rules, in accordance with an embodiment of the present invention. As shown in FIG. 4, embodiments of the present invention provide a system and method to investigate dead rules. The system and method can investigate why certain rules are not hit; for example, the cause might be a related forwarding table that does not send traffic to the dead rule. For example, as shown in FIG. 4, flow type A 402 directs traffic to dead rule 404 through rule 406. Similarly, flow type B 408 directs traffic to dead rule 404 through rule 410. However, as shown in FIG. 3, rules 406 and 410 are also dead rules, as such there is no path to rule 404.

Embodiments of the present invention provide a system and method to detect rules within the same or different tables that have overlapping match fields, and present this to the user.

Embodiments of the present invention provide a system and method to detect rules within the same or different tables related to a given input rule such that packets matching them will also be matched by the given rule.

Embodiments of the present invention provide a system and method to detect rules within the same or different tables that are ambiguous due to having the same matching priority, and some or full overlap in match fields.

Embodiments of the present invention provide a system and method to analyze rules and the network more generally, and provide suggestions for optimization, such as the elimination of rules, modification to rules, or addition of other rules.

Embodiments of the present invention provide a system and method to analyze and detect problems within the network, and provide suggestions to the user on how to fix them. These problems include those detected by network checks, queries, or other performance, optimization, or correctness related problems. The invention may also automatically apply changes to fix such problems.

Embodiments of the present invention provide a system and method to modify a snapshot of a network to model and test potential changes to the network before making changes to the actual physical/virtual network. For example, if one or more changes are being made to the network (e.g., configuration information is being updated on one or more network devices in the network), those changes can be tested using the network model prior to pushing those changes to the actual network devices, or prior to adding or removing network devices to or from the network. In this example, changes can include adding or removing network devices to or from the network, updating forwarding tables, or any other configuration changes that may affect forwarding behavior through the network. Checks, as described above, may then be run on the updated network model to identify potential failures associated with the changes made to the network. Once the updated network model has passed the checks, the changes can be pushed to the corresponding network devices in the network. In some embodiments, the network management system can automatically send updated configuration information to each network device in the network (e.g., using the one or more device interfaces). In some embodiments, the network management system can send updated configuration information only to those devices that are being updated, rather than every device in the network. In some embodiments, the network management system may cause an update interface to be displayed to a user (such as a network administrator or network developer), through which the network management system may receive manual instructions to update the configuration information at one or more devices in the network.

Embodiments of the present invention can model the effect(s) of configuration change(s) to one or more devices in a network, and how such configuration changes may affect configuration or forwarding state contained in other devices. One example would be modifying the configuration of a distributed protocol such as BGP or OSPF in one device, and modeling its effect on other devices and forwarding state in the network.

Embodiments of the present invention provide a system and method to take the configuration from a network snapshot and apply it to all devices in the network.

Figure 5:
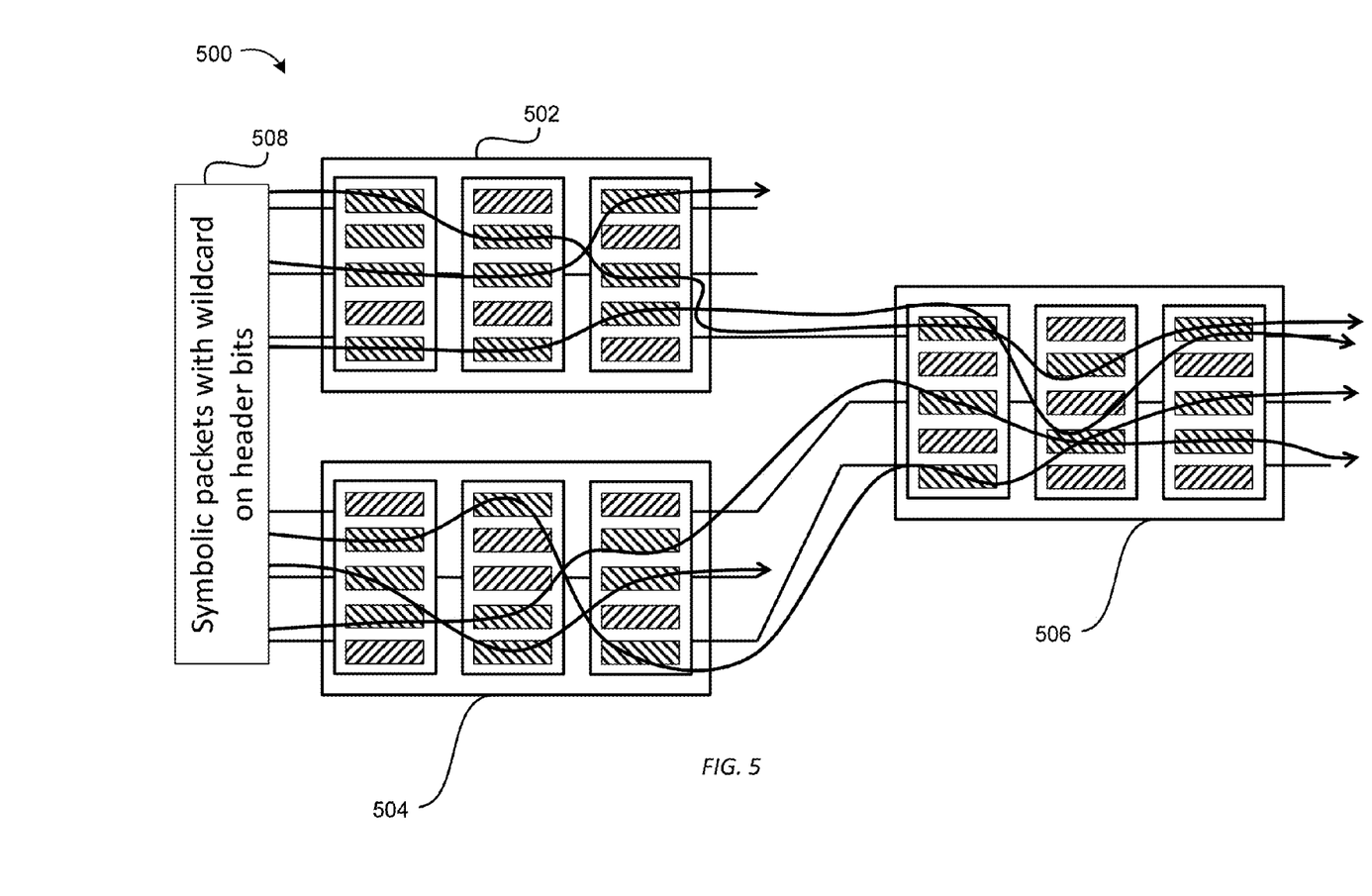
FIG. 5 is diagram illustrating an application of the network management system across multiple devices, in accordance with an embodiment of the present invention.

FIG. 5 is diagram 500 illustrating an application of the network management system across multiple devices, in accordance with an embodiment of the present invention. As shown in FIG. 5, the system and method provided herein can apply to a network including multiple network devices (502, 504, 506) instead of within a single network device. Similar to FIG. 3, symbolic packets 508 with wild card header bits can be sent across the multiple network devices (502, 504, 506) to identify the possible paths that traverse these devices. Although three devices are shown in the example of FIG. 5, embodiments of the present invention can be used with any number of network devices.

In some embodiments, a request to perform a particular check can be received through a user interface, such as a graphical user interface (GUI) or command line interface (CLI). In some embodiments, check engine 118 can perform a CanReachAll check of the network. The check can be initiated by receiving an input string, such as: <HO1> CanReachAll <HO2>, where HO1 and HO2 are packet header objects (specification of values for packet header fields). In some embodiments, HO1 can specify values HO1.hValues for a list of header fields HO1.hFields, and HO2 can specify values HO2.hValues for a list of header fields HO2.hFields. In some embodiments, any header fields that are not specified by HO1.hFields can be set as wildcards at network ingress. This check can be used to verify that for all possible values of the header fields HO1.hFields and HO2.hFields as allowed by HO1.hValues and HO2.hValues, respectively, there is complete reachability from HO1 to HO2, i.e., for each possible set of values HO1.hFields can take as allowed by HO1.hValues, there exist packets entering the network with that set of values for HO1.hFields, that will exit the network with all possible set of values HO2.hFields can take as allowed by HO2.hValues. Note that any other header fields unspecified by HO1.hFields and HO2.hValues may not have complete reachability.

In some embodiments, a check, such as CanReachAll described above, can further include optional fields. For example, "from" and "to" packet header object (HO) filter specifications can optionally be augmented with a location specification (port/table/device) to narrow the flow path search. Once the flows are retrieved from the database, these location filters are not used for validation of HO reachability.

In one example of a CanReachAll check, the string "ipv4_src addr 192.168.2.0/24 canReachAll ipv4_dst addr 192.168.3.0/24" may be received. This string indicates a request to determine whether each source IP address in subnet 192.168.2.0/24 can reach all destination IP addresses in subnet 192.168.3.0/24. The reachability may potentially be valid only for a subset of protocols, port numbers etc. The check condition here does not look for reachability across all protocols. Unless there is source HO based filtering/forwarding in the network, this kind of reachability is likely to always be present as long as the network contains the specified destination IP subnet.

In another example of a CanReachAll check, the string "router1 port1 ipv4_src addr 192.168.2.0/24 canReachAll ipv4_dst addr 192.168.3.0/24" can be received, which indicates a request to check whether each source IP address in subnet 192.168.2.0/24 at router1 and port1 can reach all destination IP addresses in subnet 192.168.3.0/24. By specifying a port number or location, the search is narrowed to ensure that the source HS at that particular source port number (location) can reach the specified destination IP subnet.

In another example of a CanReachAll check, the string "ip_proto tcp ipv4_src addr 192.168.2.0/24 canReachAll ipv4_dst addr 192.168.3.0/24" can be received, which indicates a request to check whether each source IP address in subnet 192.168.2.0/24 can reach all destination IP addresses in subnet 192.168.3.0/24 using TCP packets. This check explicitly verifies a specific protocol to address.

In one example of a CanReachAll check, the string "ip_proto ALL ipv4_src addr 192.168.2.0/24 canReachAll ipv4_dst addr 192.168.3.0/24" can be received which indicates a request to check whether each source IP address in subnet 192.168.2.0/24 can reach all destination IP addresses in subnet 192.168.3.0/24 using all IP protocol types.

In some embodiments, some assumptions may be made on check string input. For example, in some embodiments it may be assumed that the set of header fields in HO1 and HO2 must be orthogonal. For example, if the same header field (e.g. ipv4_dst) is specified in both HO1 and HO2, then the value for the field in at least one of HO1 and HO2 must contain no wildcard bits. Additionally, for the set of matching flow paths, if any rule in the network can look at the value of a header field hField1 specified in HO1 and dynamically rewrite the value of a header field hField2 specified in HO2 based on the value of hField1 in HO1, at least one of the following conditions must hold: 1) the value of hField1 in HO1 has no wildcard bits and/or 2) the value of hField2 in HO2 has no wildcard bits.

In some embodiments, a given check can include multiple extensions. For example, the CanReachAll check can include the following extensions.

1. <HO1> canReachAll <list of ports P>—For each possible set of values HO1.hFields can take as allowed by HO1.hValues, there exist packets entering the network that can exit the network at each of the ports in the list P.

2. <list of ports P> canReachAll <HO2>—There exist packets entering the network at each ingress port in the list P that can exit the network with each possible set of values HO2.hFields can take as allowed by HO2.hValues.

3. <HO1> canOnlyReach <list of ports P>—For each possible set of values HO1.hFields can take as allowed by HO1.hValues, there exists no packet that can exit the network at any egress port other than those in the list P.

4. <HO1> canReachAll <list of devices D> and <list of devices> canReachAll <HO2>—Similar to 1 and 2, but with devices instead of ports.

5. <list of ports P1> canReachAll <list of ports P2>—For each source port in the list P1, there exist packets that can reach each of the ports in the list P2.

6. <HO1> atEachOf <list of ports P1> canReachAll <HO2> atEachOf <list of ports P2>—For each source port srcP in the list P1, and each destination port dstP in the list P2, srcP <HO1> canReachAll dstP <HO2> holds. For example, for each possible pair of ports from P1 and P2, there is complete reachability from the source HS HO1 to the destination HS HO2.

7. <HO1> onlyAt <list of ports P1> canReachAll <HO2> onlyAt <list of ports P2>—<HO1> canReachAll <HO2> holds, but we only query for those flow paths that begin at a source port from the list P1 and end at a destination port from the list P2.

Although the above example CanReachAll check is described with respect to a text-based interface, similar functionality may also be abstracted behind a GUI or other user interface that exposes similar behavior.

Embodiments of the present invention can provide a multi-domain or "truly distributed" collection and testing system. In this mode, the verification process runs on a mix of local agents (each responsible for a subset of the network) and global agents (responsible for the entire network). Rule changes that can be validated locally are processed immediately by the relevant local agent, and are then synchronized with the global agents. Rule changes that affect multiple local agents must be implemented by the global agents, which may enforce a single global ordering on all rule events. Optionally, the topology and rule knowledge may be presented to each local agent in a way that aggregates or otherwise filters out some of the global knowledge, to enhance scalability.

Embodiments of the present invention can provide a high availability mode, where multiple collection agents may be run, and they may coordinate together to collect network configuration and state. In the event that one or more fail, the other agents may coordinate to collect the state from which the devices the failed agents were collecting.

Embodiments of the present invention can identify where different network elements such as IP addresses, IP subnets or VLANs are present in the network. For example, the network model can be used to locate the IP address 192.168.10.2 in the network as being located on router1 port1 and accessible over VLAN 10. In some embodiments, this may be done without sending any real packets through the network. The invention can also be used to locate IP subnets. For example, the network model can determine that the IP subnet 10.1.0.0/24 is spread across 3 different router ports in the network along with specific VLANs on which that the IPs are reachable.

In some embodiments, a query interface may be provided to locate IP addresses, IP subnets, VLANs, devices, network interfaces or other network elements. The interface may further be augmented with visual diagrams that locate the elements in the network.

Embodiments of the present invention can provide an interface to trace classes or types of traffic through the network. For example, searching for the traffic traces from a source IP address 10.0.0.10 to an IP subnet 10.1.2.0/24 can illustrate paths that the queried traffic can take through the network, and provide a manner of refining the search by visually presenting additional filters relevant to the search results.

In some embodiments, the trace results are classified along various dimensions such as paths, values of header fields at different devices in the network, path length etc., to generate some of the filters that can help refine the trace search results. A network manager or a user of the system can use the suggested filters to refine the trace and rapidly converge to the relevant traffic of interest. For example, the network manager may search for traffic traces from source IP address 10.0.0.10 to IP subnet 10.1.2.0/24 and the system presents the network manager with the list of devices [router1, router2, router3, router4] traversed by the trace results and that some traces relevant to the search are dropped at router2. The network manager then selects router2 and chooses to only view the dropped traffic. The system then presents the network manager with only those trace results that match these additional filters as well.

Embodiments of the present invention can provide an interface where the user can view virtual packet traces. These are computed by the system without sending actual packets into the network. The trace itself may comprise traffic that traverses different VLANs, or several different IP addresses, rather than describe only a single packet. In some embodiments, the system can also present the user with traces that correspond to individual actual packets that can be seen in the network.

Figure 6:
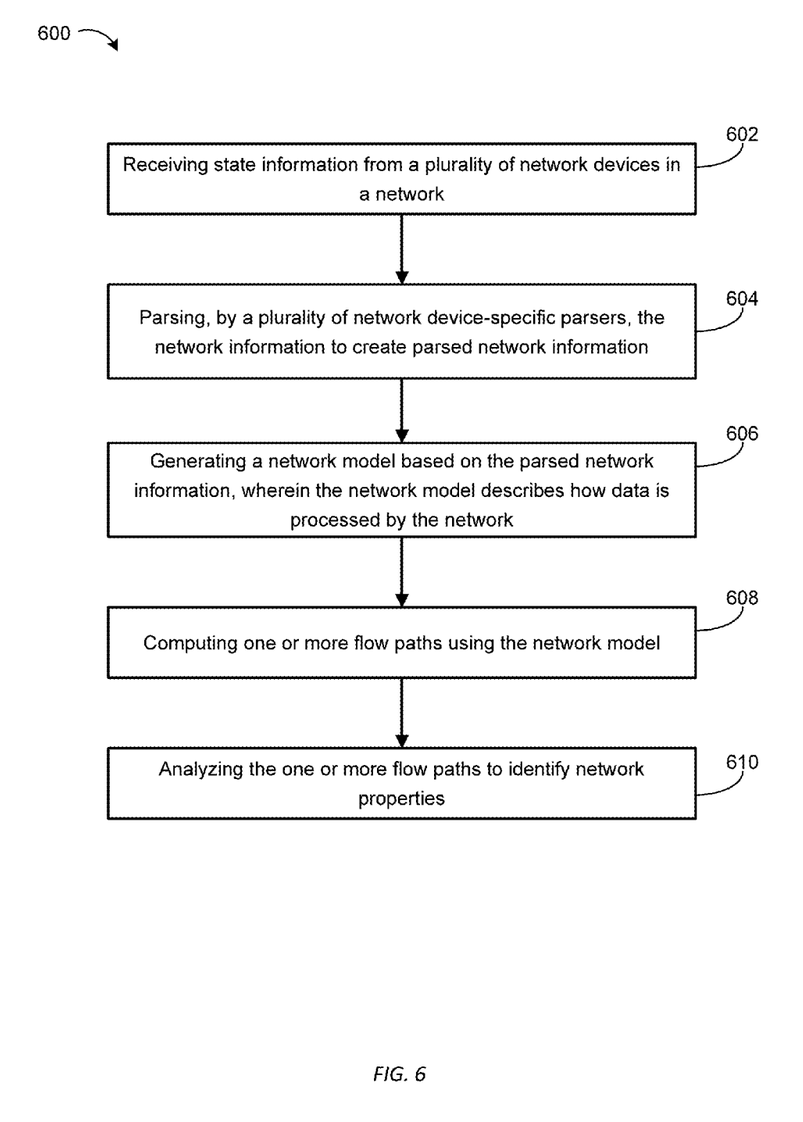
FIG. 6 is diagram illustrating a method of network management, in accordance with an embodiment of the present invention.

FIG. 6 is diagram illustrating a method 600 of network management, in accordance with an embodiment of the present invention. At 602, state information can be received from a plurality of network devices in a network. As described above, state information can include information received from a device, or devices, in the network (e.g., forwarding states, configuration files, internet protocol (IP) tables, and rules) and/or information received from a user, such as a developer or administrator, (e.g., network topology information). The state information can be received through one or more device, network, and/or protocol specific interfaces (e.g., SSH, telnet, SNMP, NETCONF, OpenFlow, or via any other mechanism that enables the collectors to collect information from the device or network).

At 604, a plurality of network device specific parsers can parse the network information to create parsed network information. In some embodiments, the network device specific parsers can include vendor-specific and/or protocol-specific parsers. For example, a Cisco parser may be used to parse devices using Cisco IOS (e.g., reading IOS command output, compressing IP forwarding tables, and generating forwarding descriptions), a Juniper Junos parser may be used to parse Juniper devices, an OpenFlow parser may be used to parse state information received from OpenFlow devices, etc. In some embodiments, the plurality of network device specific parsers can include one or more incremental parsers used to track changes made to state information received from the plurality of network devices.

At 606, a network model can be generated based on the parsed network information. The network model can describe how data is processed by the network. As described above, in some embodiments, the network model can include forwarding rules that can be used to determine how data is routed through the network. In some embodiments, the network model can represent a snapshot of the network at a given time and may be updated to reflect changes to the state information received from the plurality of network devices. In some embodiments, the state information used to generate the network model can be backed up.

At 608, one or more flow paths can be computed using the network model. In some embodiments, the one or more flow paths can include all possible port-to-port paths in the network. Symbolic packets can be pushed through the network model, which include one or more wild card bits. The wild card bits can be updated (e.g., replaced with a '1' or '0') as each forwarding rule is encountered. The changes made to the wild card bits can be used to identify a transfer function associated with a particular flow path. In some embodiments, the one or more flow paths can be stored in a data store. In some embodiments, as changes are detected to the state information (e.g., using the incremental parser), the one or more flow paths can be updated based on the change, and the updated one or more flow paths can be stored in the data store.

At 610, analyzing the one or more flow paths to identify network properties. As described above, properties of possible flows in the network can include path, header, hop counts (the number of physical or virtual network elements a flow traverses, or the number of tables within those devices it traverses), quality of service properties such as priority, queues, ports, physical devices the flow traverses, tables within the device, physical characteristics such as location(s) or distance, forwarding type of the packet (L2, L3, MPLS, etc.), packet header modifications, encapsulated packet header properties, or allocated bandwidth.

In some embodiments, the flow paths can be analyzed by querying the data store based on a particular network property, receiving flow paths that match that query, and then comparing the received flow paths to a rule associated with the particular network property. For example, a query can be submitted to identify a number of failover paths between particular locations (i.e., a particular network property) and flow paths matching the failover paths may be returned. The number of flow paths returned may then be compared to a predetermined number (i.e., a rule associated with the particular property). Similar checks may also be performed to validate other network properties, as described above. In some embodiments, a report may be generated based on the comparison of the subset of the one or more flow paths to the at least one rule, the report including one or more suggested network configuration changes. For example, if the number of failover paths is less than the predetermined number, the report may include suggested changes to increase the number of available paths.

In some embodiments, the one or more flow paths can be analyzed to identify one or more violations of at least one network property. For example, as described above, a network property may be associated with one or more rules. When the network state information does not meet the conditions defined in the one or more rules, a violation of the network property may be indicated. Network properties and associated rules may be received from a user, such as a network administrator, developer, or other user, inferred by the network management system based on current network state information, or extracted from other third party sources. In some embodiments, when a violation of a network property is identified, a report identifying a configuration of a network device associated with the one or more identified violations can be generated. The generated report can be stored and/or a user can be sent an alert including the generated report.

Figure 7:
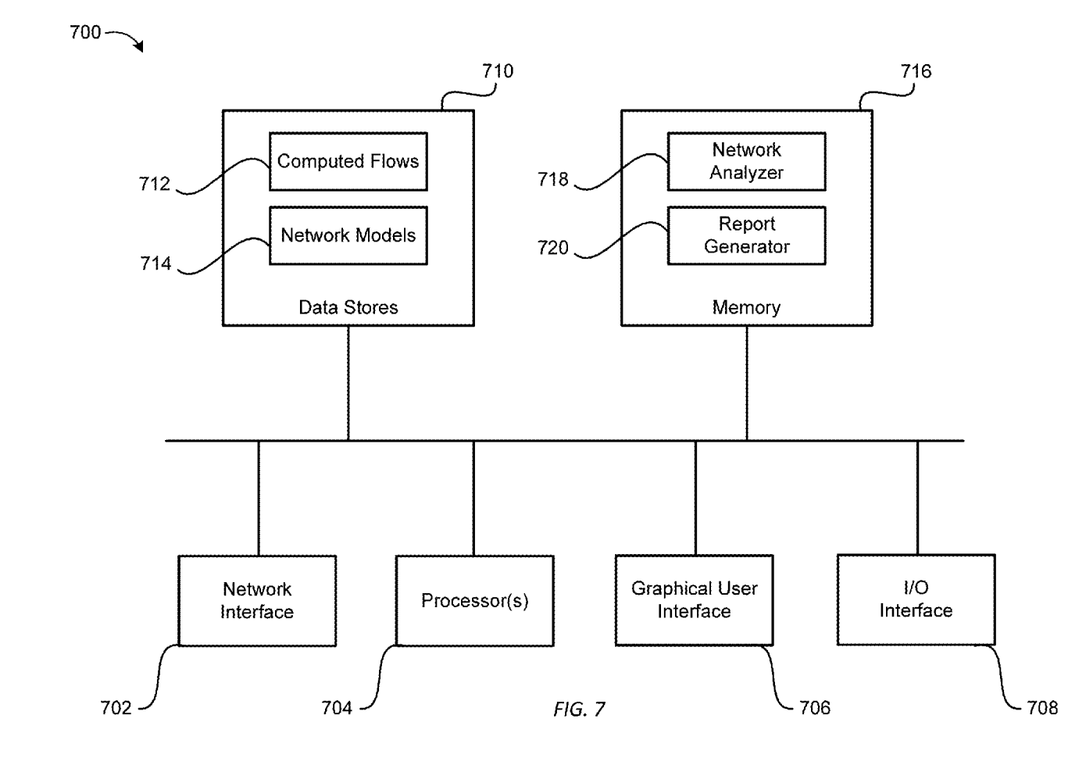
FIG. 7 is a high level block diagram of a computer system, in accordance with an embodiment of the present invention.

FIG. 7 is a high-level block diagram 700 of a computer system, in accordance with an embodiment of the present invention. As shown in FIG. 7, a computer system can include hardware elements connected via a bus, including a network interface 702, that enables the computer system to connect to other computer systems over a local area network (LAN), wide area network (WAN), mobile network (e.g., EDGE, 3G, 4G, or other mobile network), or other network. The computer system can further include one or more processors 704, such as a central processing unit (CPU), field programmable gate array (FPGA), application-specific integrated circuit (ASIC), network processor, or other processor. Processors may include single or multi-core processors.

In some embodiments, the computer system can include a graphical user interface (GUI) 706. GUI 706 can connect to a display (LED, LCD, tablet, touch screen, or other display) to output user viewable data. In some embodiments, GUI 706 can be configured to receive instructions (e.g., through a touch screen or other interactive interface). In some embodiments, I/O interface 708 can be used to connect to one or more input and/or output devices such as mice, keyboards, touch-sensitive input devices, and other input or output devices. I/O interface 708 can include a wired or wireless interface for connecting to infrared, Bluetooth, or other wireless devices.

In some embodiments, the computer system may include local or remote data stores 710. Data stores 710 can include various computer readable storage media, storage systems, and storage services, as are known in the art (e.g., disk drives, CD-ROM, digital versatile disk (DVD) or other optical storage, magnetic cassettes, magnetic tape, magnetic disk storage or other magnetic storage devices, relational databases, object storage systems, local or cloud-based storage services, or any other storage medium, system, or service). Data stores 710 can include data generated, stored, or otherwise utilized as described herein. For example, data stores 710 can include computed flows 712 and network models 714, generated and stored as described above. Memory 716 can include various memory technologies, including RAM, ROM, EEPROM, flash memory or other memory technology. Memory 716 can include executable code to implement methods as described herein. For example, memory 716 can include a network analyzer module 718 and report generator module 720 that each implement methods described herein.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed is:

1. A computer-implemented method, comprising:
   collecting state information from a plurality of network devices in a network, wherein the state information is collected by taking a snapshot of a topology of the plurality of network devices, wherein the state information includes forwarding states;

parsing, by a plurality of network device-specific parsers, the state information to create parsed state information;

generating a network model based on the parsed state information, wherein the network model is based at least in part on a series of forwarding tables which describe how data is processed by the network; and computing one or more flow paths based at least in part on symbolic packets pushed through the network model, wherein the symbolic packets include one or more wild card bits and identify a packet or class of packets as the packet or the class of packets travel through the network, wherein a modification to the packet or the class of packets along the one or more flow paths is computed by pushing the symbolic packets through the network model.

2. The computer-implemented method of claim 1, wherein the state information includes one or more of configuration files, internet protocol (IP) tables, and rules received from the plurality of network devices.

3. The computer-implemented method of claim 1, wherein the state information further includes network topology data received from a user.

4. The computer-implemented method of claim 1, wherein analyzing the one or more flow paths to identify network properties further comprises:

verifying network correctness invariants.

5. The computer-implemented method of claim 1, further comprising:

storing the one or more flow paths in a data store;

detecting, using at least one of the plurality of parsers, a change to the state information associated with at least one network device in the network;

updating the one or more flow paths based on the change; and storing the updated one or more flow paths in the data store.

6. The computer-implemented method of claim 1, further comprising:

storing the one or more flow paths in a data store; and wherein analyzing the one or more flow paths to identify network properties further comprises:

querying the data store based on at least one network property;

receiving a subset of the one or more flow paths from the data store in response to the query; and comparing the subset of the one or more flow paths to at least one rule associated with the at least one network property.

7. The computer-implemented method of claim 6, further comprising:

generating a report based on the comparison of the subset of the one or more flow paths to the at least one rule, the report including one or more suggested network configuration changes.

8. The computer-implemented method of claim 1, further comprising:

analyzing the one or more flow paths to identify one or more violations of at least one network property.

9. The computer-implemented method of claim 8, further comprising:

generating a report identifying a configuration of a network device associated with the one or more identified violations.

10. A system, comprising:

one or more processors; and one or more memory devices including instructions that, when executed by the one or more processors, cause the system to:

collect state information from a plurality of network devices in a network, wherein the state information is collected by taking a snapshot of a topology of the plurality of network devices, wherein the state information includes forwarding states;

parse, by a plurality of network device-specific parsers, the state information to create parsed state information;

generate a network model based on the parsed state information, wherein the network model is based at least in part on a series of forwarding tables which describe how data is processed by the network; and compute one or more flow paths using the network model based at least in part on symbolic packets pushed through the network model, wherein the symbolic packets include one or more wild card bits and identify a packet or class of packets as the packet or the class of packets travel through the network, wherein a modification to the packet or the class of packets along the one or more flow paths is computed by pushing the symbolic packets through the network model.

11. The system of claim 10, wherein the state information includes one or more of configuration files, internet protocol (IP) tables, and rules received from the plurality of network devices.

12. The system of claim 10, wherein the state information further includes network topology data received from a user.

13. The system of claim 10, further comprising:

storing the one or more flow paths in a data store;

detecting, using at least one of the plurality of parsers, a change to the state information associated with at least one network device in the network;

updating the one or more flow paths based on the change; and storing the updated one or more flow paths in the data store.

14. The system of claim 10, further comprising:

storing the one or more flow paths in a data store; and wherein analyzing the one or more flow paths to identify network characteristics further comprises:

querying the data store based on at least one network property;

receiving a subset of the one or more flow paths from the data store in response to the query; and comparing the subset of the one or more flow paths to at least one rule associated with at least one network property.

15. The system of claim 14, further comprising:

generating a report based on the comparison of the subset of the one or more flow paths to the at least one rule, the report including one or more suggested network configuration changes.

16. A non-transitory computer readable storage medium including instructions that, when executed by one or more processors, cause the system to:

collect state information from a plurality of network devices in a network, wherein the state information is collected by taking a snapshot of a topology of the plurality of network devices, wherein the state information includes forwarding states;

parse, by a plurality of network device-specific parsers, the state information to create parsed state information;

generate a network model based on the parsed state information, wherein the network model is based at least in part on a series of forwarding tables which describe how data is processed by the network; and compute one or more flow paths using the network model based at least in part on symbolic packets pushed through the network; wherein the symbolic packets include one or more wild card bits and identify a packet or class of packets as the packet or the class of packets travel through the network, wherein a modification to the packet or the class of packets along the one or more flow paths is computed by pushing the symbolic packets through the network model.

17. The non-transitory computer readable storage medium of claim 16, wherein the state information includes:

one or more of configuration files, internet protocol (IP) tables, rules received from the plurality of network devices; and network topology data received from a user.

18. The non-transitory computer readable storage medium of claim 17, further comprising:

storing the one or more flow paths in a data store;

detecting, using at least one of the plurality of parsers, a change to the state information associated with at least one network device in the network;

updating the one or more flow paths based on the change; and storing the updated one or more flow paths in the data store.

19. The non-transitory computer readable storage medium of claim 17, further comprising:

storing the one or more flow paths in a data store; and wherein analyzing the one or more flow paths to identify network characteristics further comprises:

querying the data store based on at least one network property;

receiving a subset of the one or more flow paths from the data store in response to the query; and comparing the subset of the one or more flow paths to at least one rule associated with at least one network property.

20. The non-transitory computer readable storage medium of claim 16, further comprising:

generating a report based on the comparison of the subset of the one or more flow paths to the at least one rule, the report including one or more suggested network configuration changes.

\* \* \* \* \*